US009944187B2

(12) United States Patent
Arumugam

(10) Patent No.: US 9,944,187 B2
(45) Date of Patent: *Apr. 17, 2018

(54) WIND BASED LOAD ISOLATED ELECTRICAL CHARGING SYSTEM

(71) Applicant: Kannappan Chettiar, Singapore (SG)

(72) Inventor: Rajendra Babu Arumugam, Chennai (IN)

(73) Assignee: KANNAPPAN CHETTIAR, Singapore (SG)

( * ) Notice: Subject to any disclaimer, the term of this patent is extended or adjusted under 35 U.S.C. 154(b) by 224 days.

This patent is subject to a terminal disclaimer.

(21) Appl. No.: 14/920,967

(22) Filed: Oct. 23, 2015

(65) Prior Publication Data

US 2016/0144722 A1 May 26, 2016

Related U.S. Application Data

(63) Continuation of application No. 13/319,026, filed as application No. PCT/IN2010/000780 on Dec. 2, 2010, now Pat. No. 9,193,266.

(30) Foreign Application Priority Data

Dec. 2, 2009 (IN) .......................... 2965/CHE/2009

(51) Int. Cl.
*B60L 8/00* (2006.01)
*B60L 11/18* (2006.01)
(Continued)

(52) U.S. Cl.
CPC ................. *B60L 8/006* (2013.01); *B60L 8/00* (2013.01); *B60L 11/1809* (2013.01); *F03D 9/11* (2016.05);
(Continued)

(58) Field of Classification Search
CPC ...... B60L 8/006; B60L 11/1809; F03D 9/002; F03D 9/021; F03D 11/02; Y10S 74/09; H02K 53/00
(Continued)

(56) References Cited

U.S. PATENT DOCUMENTS 4,955,560 A 9/1990 Nishina et al.
5,957,408 A 9/1999 Hall et al.
(Continued)

FOREIGN PATENT DOCUMENTS

CN 1200995 12/1998
CN 201046676 Y 4/2008
(Continued)

*Primary Examiner* — Daniel Kessie
(74) *Attorney, Agent, or Firm* — FisherBroyles, LLP; Robert Kinberg

(57) ABSTRACT

The invention relates to electrically operated vehicle with power supply system having wind based charging unit with load isolation. The power supply nit has one or more energy storage device with an inverter for supplying AC loads. Two such power supply units are used in an electric vehicle application for supplying the drive load. The power supply units when operated through an intermediate section and an output combiner, supplies to the load with complete isolation from the recharging unit of the system. Due to which, the energy storage devices serves for large distance range.

11 Claims, 2 Drawing Sheets

(51) Int. Cl.
  *F03D 9/25* (2016.01)
  *F03D 9/11* (2016.01)
  *F03D 15/00* (2016.01)
  *H02K 53/00* (2006.01)

(52) U.S. Cl.
  CPC .............. *F03D 9/25* (2016.05); *F03D 15/00* (2016.05); *B60L 2200/12* (2013.01); *H02K 53/00* (2013.01); *Y02T 10/7083* (2013.01); *Y10S 74/09* (2013.01)

(58) Field of Classification Search
  USPC ................................................. 307/9.1, 10.1
  See application file for complete search history.

(56) References Cited

U.S. PATENT DOCUMENTS

| | | | | |
|---|---|---|---|---|
| 6,897,575 | B1* | 5/2005 | Yu | B60K 16/00 180/65.265 |
| 7,045,979 | B2* | 5/2006 | Mehlhorn | H02P 25/04 318/108 |
| 7,456,511 | B1* | 11/2008 | Chu | G01S 5/0027 290/44 |
| 7,802,641 | B2* | 9/2010 | Friedmann | B60K 16/00 180/2.1 |
| 7,828,091 | B2* | 11/2010 | Wedderburn, Jr. | B60K 6/12 180/2.1 |
| 7,956,584 | B2 | 6/2011 | Peterson et al. | |
| 8,169,182 | B1* | 5/2012 | Kimble | B60L 8/006 290/44 |
| 8,307,930 | B2* | 11/2012 | Sailor | B60K 1/04 180/65.275 |
| 8,371,401 | B1* | 2/2013 | Illustrato | B60K 16/00 180/2.2 |
| 8,476,554 | B2 | 7/2013 | Samodell | |
| 8,618,683 | B2* | 12/2013 | Diaz | F03D 9/00 290/44 |
| 2004/0195016 | A1 | 10/2004 | Shimizu et al. | |
| 2005/0218657 | A1 | 10/2005 | Weesner et al. | |
| 2010/0006351 | A1 | 1/2010 | Howard | |
| 2010/0157638 | A1 | 6/2010 | Naiknaware et al. | |

FOREIGN PATENT DOCUMENTS

| | | |
|---|---|---|
| GB | 2124986 | 2/1984 |
| JP | 2002-325368 | 11/2002 |
| WO | WO-2007110874 A1 | 10/2007 |

\* cited by examiner

WIND BASED LOAD ISOLATED ELECTRICAL CHARGING SYSTEM

FIELD OF THE INVENTION

This invention relates to an electrically operated power supply system with wind based charging unit with load isolation.

This invention is utilized for any system which is operated electrically and has provision for utilizing the wind energy for charging the energy storage devices. This invention is relevant for wind mill and electric vehicle applications. This invention is more particularly relevant for vehicle in which the prime mover is a DC or AC motor. The said vehicles may be road, sea or combinations thereof. This invention is also applicable in a hybrid type of vehicle.

For the purpose of clarity and conciseness, in the following description reference is mainly with, respect to an electric vehicle and more specifically to a two wheeler vehicle wherein the prime mover is a AC motor or DC motor. This is without any limitation to the scope of the invention.

BACKGROUND OF THE INVENTION

In electric vehicles, the traction power comes from energy storage devices, very commonly a set of batteries. The electric vehicles are characterized by limited speed and distance range. In order to achieve higher speed and distance range, large battery packs are adopted but this leads to disadvantages like high cost of batteries and large space requirements for battery stacking and also increase in the overall weight of the vehicle.

Various methods has been followed for improving the speed and distance range of the electric vehicle which includes making use of the regenerative energy of the vehicle for charging the battery packs, utilizing solar energy and bulky wind driven generator units with one or more turbines located in wind tunnel or combinations of the above methods for charging the batteries. The recharging power obtained from using the regenerative energy is not adequate to make up the loss spent by the batteries for driving the load. Similarly, the use of solar energy and bulky wind generators in wind tunnel systems always proved to be not feasible because of the recharging power requirements of the large battery packs and the space requirements for installation of the above systems.

The prior art specifications 569/CHE/2006, 903/CHE/2008 for electric vehicles with the recharging units by the same inventor are included herein as references. In the prior art specifications, various solutions have been followed for recharging the batteries during the vehicle movement to fill up the battery energy spent in driving the load. While carrying out the recharging of the batteries during movement of the vehicle, the drive load creates an impact on the output of the recharging unit like wind generators thereby affecting the online charging of the batteries. Due to the variations in the velocity of the vehicle, the frequency of discharge of the batteries was unpredictable. Based on the accelerations, the battery energy is depleted and so the limitation for starting recharge of the batteries was kept as the threshold voltage of the batteries. Whenever the battery supplying the load depletes upto the threshold voltage, the recharging unit takes over the battery for charging it. Meanwhile the load was connected to the already charged battery so that there is no interruption in the vehicle movement. But, due to unpredictable load variations, there was always a mismatch between the charging and discharging of the battery. The charging unit consumes more time in charging the batteries while the time taken for discharging the batteries through the load is very less. And also it is quite difficult to charge a battery at the tame inoinein it is discharging to load as the charger unit it directly affected by the load. This has led to the problems in achieving the desired distance range with online charging of the battery packs.

SUMMARY OF THE INVENTION

An attempt has been made to enhance the battery range with comparatively simpler construction by minimizing the withdrawal of current from the battery to the extent possible, by preventing or reducing the breaks in the battery charging current and by ensuring uniform operation of the wind operated battery charging system with complete isolation of the wind operated battery recharging system from the drive load of the vehicle.

In case of an electric vehicle, the wind generator operates with head wind present during vehicle movement. In case of vehicle movement in a traffic congested area, the driver is given an option of using the wind generator or running the vehicle without engaging the wind generator.

For the sake of clarify and conciseness, let us consider the case of a power supply unit in a two wheeler electric vehicle and batteries as the energy storage devices in the following description. But other types of storage units like field, etc. is also feasible. The electric vehicle comprises of routine components like drive motor, motor speed controller, gear and brake mechanism, acceleration means.

The power required for driving the load is derived from two or more power supply units. The load requirements like speed and distance range are customer specified based on which the system is designed. In case of two wheeler vehicle, two power supply units are employed and designated as PS1 and PS2. Each power supply unit has a battery or a plurality of batteries connected in series/parallel or in combinations, depending on the required distance range of the vehicle. The batteries (i.e.) the energy storage devices are preferably of the same type and specification. The power supply unit comprises of an inverter for supplying to AC load. For DC loads, the inverted output is rectified and given to the load or simply the output is supplied through a voltage controller. The batteries in the power supply units are designed such that the accumulator unit is integrated with a suitable set of condensers. The operation of the condensers integrated with accumulator unit is such that the condensers receive the floating voltage that is available after the complete charging of the batteries from the wind generator units. This prevents the battery from depleting faster. The inverter or the voltage controller present in the power supply unit ensures a uniform and stabilized AC or DC output respectively based on the load requirements.

The load is connected to the output of the power supply unit through an Intermediate section and an output combiner. The system is designed in such a way that the load requirement is shared among the PS1 and PS2. This sharing of the load enables partial discharge of the batteries connected with the load. Hence, the batteries are not fully loaded. This leads to better battery life. An Intermediate section is the unit specifically designed with number of contacts on a single or multiple shafts rotated by motor to shift the output of the wind generator unit between PS1 and PS2 for recharging the batteries in PS1 or PS2. Similarly, the intermediate section also shifts the supply to the load between PS1 and PS2. The operation carried out in the intermediate section during the half cycles is independent of each other and by this the wind generator performance is not affected by the variations of the load. Because of this working, the batteries in the power supply units are not left depleted up to the threshold level. They are put into the recharging mode in a gap of each half cycle by the Intermediate section. The output combiner is the unit to combine the outputs from the intermediate section to supply the required current to drive the load. Whenever the Intermediate section connects PS1 to wind generator, the output from PS2 is given to the combiner. Similarly, when PS2 is connected to wind generator, the output from PSI is given to the combiner. This changeover happens in a frequency such that the output from PS1 and PS2 is always available at the combiner. The combiner operates such that the full load requirements are always satisfied in any moment. The load and recharging units are made to operate individually without interference with each other. This way, the distance range of the vehicle is improved to a greater extent. The wind generator unit, power supply unit (PS1,PS2, . . . ), intermediate section, output combiner makes the power supply system of the vehicle. The recharging unit is used synonymous to the wind generator (s) and the charging unit throughout this specification.

This system is also very useful in a situation in which the vehicle moves in a congested area without engaging the wind generator due to the fact the batteries are not fully loaded at any point of vehicle motion. This also leads to operating the vehicle to wide distance ranges. Even after complete depletion of the batteries in the power supply units, the modular drawer like arrangement for battery stacking in the vehicle as disclosed in the earlier specifications of this inventor, makes the replacement of the batteries very simple and easy as it is plug and socket arrangement and is also accident proof.

The second embodiment of the power supply system in which a set of wind generators are employed for recharging the energy storage devices. One of the wind generators recharges the power supply units (PS1 or PS2) at any moment while the other wind generator rotates freely. By this, the continuous loading of a single wind generator is avoided. The intermediate section connects the wind generator units in such a manner that the recharging of the parallel combination of the energy storage devices takes place at any instant. At the same time, the intermediate section connects the series combination of the devices to the drive motor (i.e) load through voltage controller. The parallel and series combinations of the energy storage devices are achieved for every half cycle of the intermediate section. Similarly, the shifting of recharging between wind generators is achieved during every half cycle. The load receives an 'undisturbed voltage supply through the combiner.

In vehicles travelling in traffic congested are with speed limitations, the wind generator may not serve its purpose due to the absence of sufficient headwind. Hence, the vehicle utilities the power supply system without the wind generator unit or without engaging the wind generator(s). In case of first embodiment, when the recharging unit is not in use, the bypass switch is operated to parallel PS1 and PS2. The intermediate section is kept switched off. This system serves to be very useful in the above situation also, due to the fact that the batteries are not fully loaded and the load is shared between PS1 and PS2 at any point of vehicle motion. In the second embodiment, when the recharging circuit is not in use, bypass switch is used to parallel the PS1 and PS2. In this embodiment, the series and parallel configurations of the batteries in PS1 and PS2 are achieved through the Intermediate section. The Intermediate section has "lock and pin" arrangement in one shaft, the operation of which will shift the contacts in the shaft to make series configuration of the batteries connected to it. Now, by using the option in the bypass switch, PS1 and PS2 can be paralleled and Intermediate section is kept idle. The said combinations of the batteries are connected to a voltage controller (used in case of DC drive motors). The depleted battery units can be easily replaced by using the plug and socket arrangement of the battery storage module from the battery recharging station. This leads to operating the vehicles to cover distances in traffic congested area.

A method of operating a power supply system having wind based recharging unit with complete isolation from the load comprises, operating the intermediate section in such a manner that in first half cycle of operation, the output from PS1 is connected to the input of the drive motor and simultaneously, the input of the PS2 is connected to the output of the wind generator for recharging and in next half cycle the input of PS1 is connected to the output of the wind generator for recharging and simultaneously, the output from PS2 is connected to the drive motor thereby maintaining complete isolation of the recharging system and drive motor and combining the supply from PS1 and PS2 at combiner which avoids intermittence due to the shifting in Intermediate section.

This system proves to be very useful for powering the boats as enormous wind energy is available on the sea surface.

Another embodiment of the power supply is such that the capacitor banks totally replace the battery modules in it. This enables the voltage generated in the wind generators are directly supplied to the grid through intermediate section. The intermediate section completely isolates the load from the wind generators so that the performance of the wind generators is not affected by the load variations. This can be very easily adapted to a wind mills and it also simplifies the construction of the wind mills by avoiding huge blades and mounting structures. This power supply system with wind operated charging unit also can be very easily adopted as a domestic power supply system for powering the household appliances, etc.

DESCRIPTION OF THE EMBODIMENT

Figure 1:
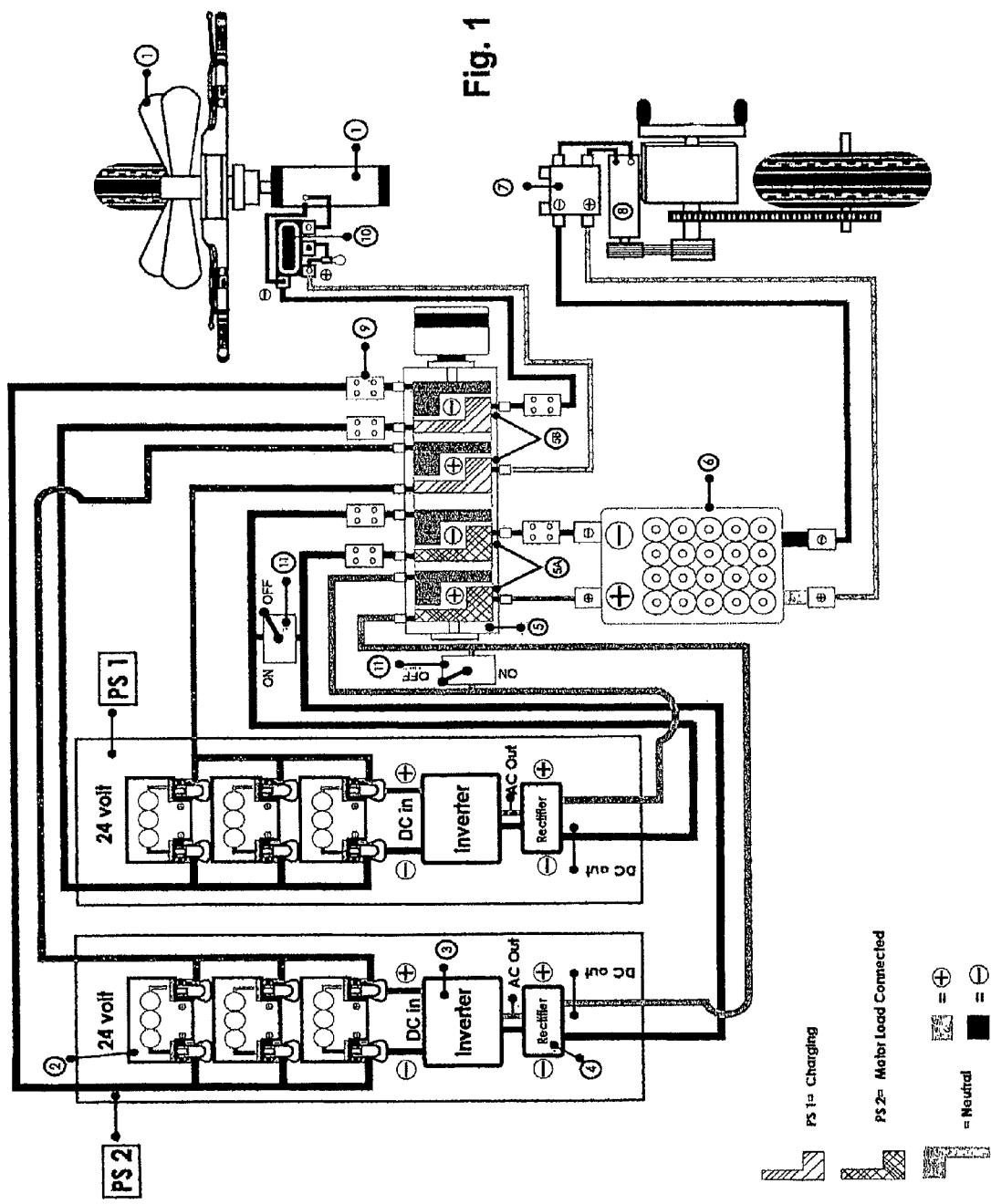
FIG. 1 represents the power supply with single wind generator incorporated in two wheeler vehicle.
Figure 2:
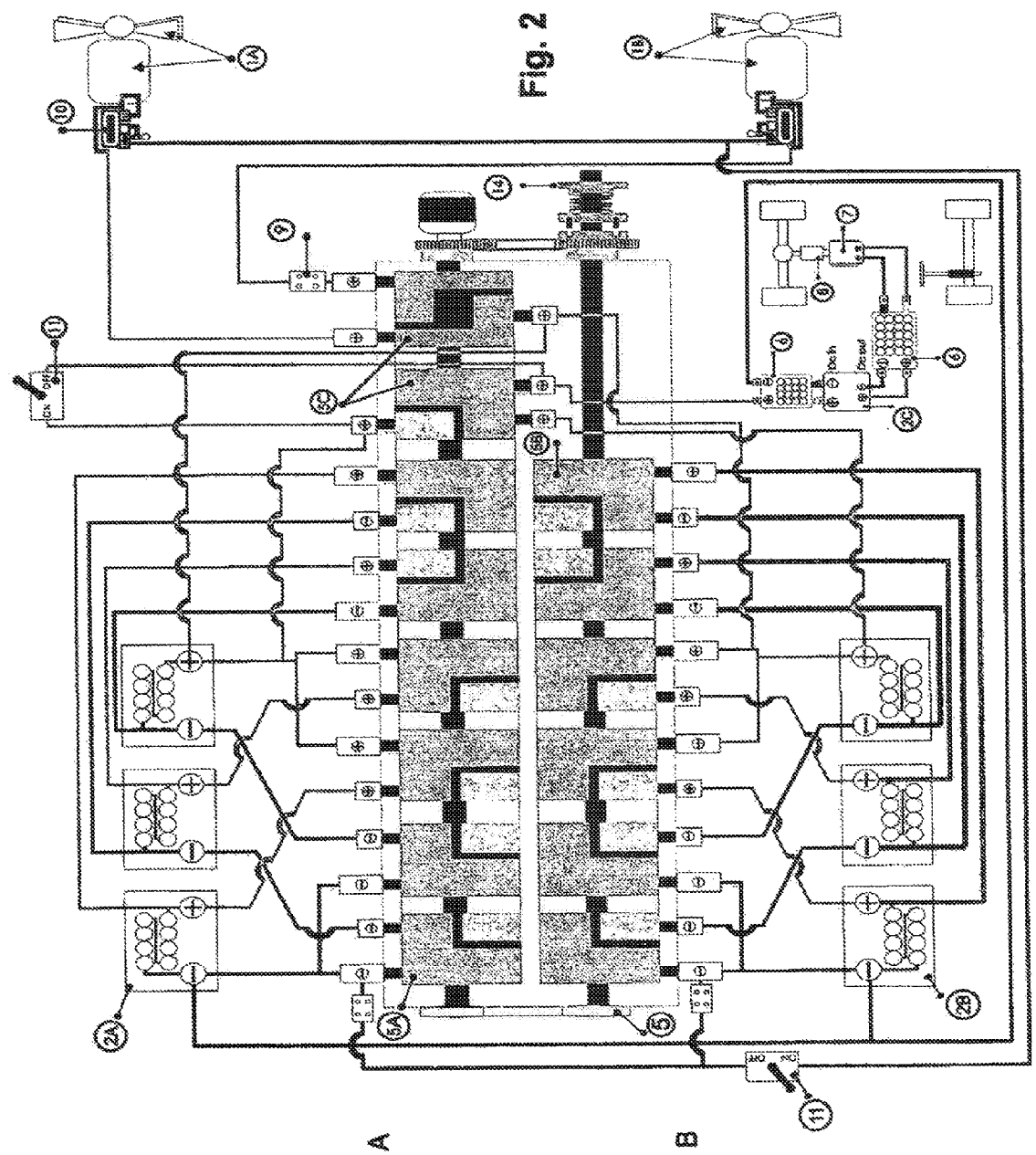
FIG. 2 represents the power supply with dual wind generators incorporated in four wheeler vehicle.

The wind generator (1) in FIG. 2 for a two wheeler vehicle is detachably mounted and is suitably positioned in the vehicle facing the headwind such that the headwind present during the vehicle motion operates the generator to its rated speed. In the example illustrated, the wind generator with fan is positioned in the front portion of the vehicle as shown. Similarly, in case of medium or heavy vehicles also, the wind generators are positioned suitable to face the maximum headwind. Other alternate position of the wind generators are also feasible based on the vehicle design.

The power supply units have batteries (2) in series and/or parallel combinations placed in modular drawer with plug and socket connections. Inverters (3) are connected to the battery for supplying to AC load or are combined with rectifier (4) for supplying to DC load through the intermediate section (5). Suppressor condensers (9) are employed to arrest the spark that may occur at the brush of the intermediate section. The working cycle of the Intermediate section is such that during first half of the cycle, it connects the output of PS1 to the combiner for supplying to the load and connects the input from the wind generator unit for recharging the battery of PS2. During the second half of the cycle, the vice versa happens, that is, the output of PS2 is connected to load and input from the wind generator unit to battery of PS1 for recharging. During both the half cycles, the load and wind generator unit are not linked and ate completely isolated from each other. It can be seen that the contact members (5a) and (5b) of the intermediate section connects PS1 to the load and PS2 to the wind generator respectively. The position of the above contact members are shifted such that 5a connects PS1 to the wind generator and 5b connects PS2 to the load. At low rpm of the intermediate section, flickering of the Output voltage occurs whereas by increasing the shaft rpm of the intermediate section the flickering vanishes. The rpm at which the flickering vanishes is fixed as the rated rpm of the intermediate section. The intermediate section can be designed as an electro-mechanical or an electronic unit. The combiner (6) is a set of condensers that receive the power supply from PS1 and PS2 during the operation of intermediate section. It ensures a continuous flow of supply to the load without any intermittence. The motor speed controller (7) is used to control the operation of the drive motor (8). The voltage regulator (10) of the wind generator operates such that whenever the batteries in PS1 or PS2 are fully charged, it cuts off the supply from the wind generator to PS1 or PS2. This prevents the generators from continuous loading. For usage of the vehicle in traffic congested area, the wind generator may not serve the purpose of recharging. Hence, it can be detached from the vehicle. By operating the bypass switch (11), the power supply units are paralleled and are connected to the load. The depleted batteries of the PS1 and PS2 are replaced easily in any battery supply station through the plug and socket arrangement of the battery storage modules in the vehicle.

In FIG. 2 is shown a system in which the recharging of the power supply units (PS1 and PS2) is shared by two wind generators (1a) and (1b). The wind generators (1a) & 1(b) are detachably mounted and suitably positioned facing the head wind. At any instant, one of the wind generators is engaged for recharging the power supply units. The power supply unit PS1 in this embodiment refers to the set of batteries (2a) and voltage controller (2c). Similarly, the power supply unit PS2 refers to the set of batteries (2b) and voltage controller (2c). The intermediate section (5) is designed such that during one half cycle of operation of the section, the battery units (2a) in PSI are paralleled by the contact member (5a) and connected to the wind generator (1a) through 5c for recharging. Simultaneously, the battery units 2(b) in PS2 are series connected through 5b and supply the drive motor while the wind generator (ib) and will be in rest mode and rotates freely.

In second half cycle, the batteries (2a) in PS1 are connected in series through 5b and supplies the drive motor (8), simultaneously, the batteries in PS2 are paralleled through 5a and receives recharging voltage from the wind generator (1b) while wind generator (1a) is in rest mode and rotates freely. By this operation the wind generators are not continuously loaded. The contacts in the intermediate section are as shown in FIG. 2. The shafts are made to rotate in unison commonly driven by a motor in intermediate section. Each contact members (5a), 5(b), 5(c) are made of conducting material with the polarities connected to them and insulation for separating the polarities. The power supply units (PS1 or PS2) in series connection supplies the drive motor through a voltage controller (2c). In the absence, of the recharging unit, the bypass switch (11) is operated. One of the shafts is provided with "lock and pin" arrangement (14) which when operated manually, sets the batteries connected to it in series configuration. Now, the bypass switch can be utilized to parallel both PS1 and PS2 and connect to the load through voltage controller. When the bypass switch is used, the intermediate section is also not operated. It serves only as idle contact.

The components of any known electric vehicle like gear and brake mechanism, acceleration means, etc. are also available in the vehicle described above.

The invention has been described with reference to the structure disclosed herein, it is not confined to the details set forth and this application is intended to cover such modification or changes as may come within the purpose of the improvements or the scope of the following claims.

The invention claimed is:

1. An electric propulsion system for an electric vehicle to supply electric energy to drive a load comprising an electric drive motor of the electric vehicle, the system comprising:
   a power supply system including at a least first and second power supply units, each power supply unit having an input and an output and including electric batteries initially charged prior to operation, connected in electrical series or electrical parallel between the input and output and producing electrical energy at the output, a discharge of the batteries determining a driving range of the vehicle;
   a wind generator having a generator output and being powered by wind to generate electric energy at the generator output in a recharging mode, and having a rest mode in which the wind generator, when rotating freely, produces no electric energy at the generator output;
   a combiner for being coupled to the drive motor and receiving electric energy from one of the first and second power supply units and ensuring a continuous flow of electric supply to the drive motor without intermittence; and
   an intermediate section
   configured during a first cycle to connect the energy storage devices of the first power supply unit in electrical series with the wind generator in rest mode, and to couple the electric output of the first power supply unit to the combiner for supplying electrical energy to the electric drive motor, and simultaneously connect the energy storage devices of the second power supply unit in electrical parallel with the wind generator for recharging the energy storage devices of the second power supply unit, and
   configured during a second cycle to connect the energy storage devices of the second power supply unit in electrical series with the wind generator in rest mode, and to couple the electric output of the second power supply unit to the combiner for supplying electrical energy to the electric drive motor, and simultaneously connect the energy storage devices of the first power supply unit in electrical parallel with the wind generator for recharging the energy storage devices of the first power supply unit;
   with electrical isolation maintained between the recharging circuits and the drive load of the vehicle.

2. The electric propulsion system of claim 1, wherein the intermediate section includes a first cycle of operation, wherein the output from power supply unit is connected to electric drive motor and the input of the second power supply unit is connected to the generator output for recharging, and a second cycle of operation, wherein the input of the first power supply unit is connected to the generator output for recharging and the output from the second power supply unit is connected to the electric drive motor.

3. The electric propulsion system of claim 1, including a bypass switch to switch the energy storage devices of each respective power supply unit to electrical parallel.

4. The electric propulsion system of claim 1, wherein the intermediate section is electro mechanical or electronic.

5. The electric propulsion system of claim 1, wherein the intermediate section has at least two contact members to which the outputs from the power supply units and input from the wind generator are connected.

6. The electric propulsion system of claim 1, wherein the contact members are made of electrically conducting material, split with insulation between polarities, and arranged on a common or different shaft driven by a motor.

7. The electric propulsion system of claim 1, wherein the wind generator is detachably mountable on the vehicle and suitably positioned to receive maximum headwind during motion.

8. The electric propulsion system of claim 1, wherein the wind generator may be disengaged from the power supply system or fully removed or detached from the vehicle.

9. A power supply system for an electric drive motor, comprising:
   at least first and second power supply units, each power supply unit having an input and an output and including electric batteries, initially charged prior to operation, connected in electrical series or electrical parallel between the input and output and producing electric energy at the output, a discharge of the batteries determine a driving rate of the vehicle;
   a wind generator having a generator output and being powered by wind to generate electric energy at the generator output in a recharging mode, and having a rest mode in which the wind generator, when rotating freely, produces no electric energy at the generator output;
   a combiner for being coupled to the drive motor and receiving electric energy from one of the first and second power supply units and ensuring a continuous flow of electric supply to the drive motor without intermittence; and
   an intermediate section
configured during a first cycle to connect the energy storage devices of the first power supply unit in electrical series with the wind generator in rest mode, and to couple the electric output of the first power supply unit to the combiner for supplying electrical energy to the electric drive motor, and simultaneously connect the energy storage devices of the second power supply unit in electrical parallel with the wind generator for recharging the energy storage devices of the second power supply unit, and configured during a second cycle to connect the energy storage devices of the second power supply unit in electrical series with the wind generator in rest mode, and to couple the electric output of the second power supply unit to the combiner for supplying electrical energy to the electric drive motor, and simultaneously connect the energy storage devices of the first power supply unit in electrical parallel with the wind generator for recharging the energy storage devices of the first power supply unit;
   wherein complete electrical isolation is maintained between the charging of the batteries and the drive motor during each time period.

10. A wind mill using a power supply system as claimed in claim 9.

11. A method of operating an electric power supply system for a load comprising an electric drive motor, the electric power supply system including first and second power supply units, a recharging system comprising a wind generator for recharging the power supply units with the wind generator having a rest mode and a recharging mode, the power supply units being initially charged prior to operation, wherein a discharge of the power supply units determines a driving range of the vehicle, and a combiner, the method comprising:
   operating an intermediate section coupled between the power supply units of the power supply system and the electric drive motor by connecting,
   in a first cycle of operation, the energy storage devices of the first power supply unit in electrical series with the wind generator in rest mode, and coupling the electric output of the first power supply unit to the combiner for supplying electrical energy to the electric drive motor, and simultaneously connecting the energy storage devices of the second power supply unit in electrical parallel with the wind generator for recharging the energy storage devices of the second power supply unit, and
   in a second cycle of operation, the energy storage devices of the second power supply unit in electrical series with the wind generator in rest mode, and coupling the electric output of the second power supply unit to the combiner for supplying electrical energy to the electric drive motor, and simultaneously connecting the energy storage devices of the first power supply unit in electrical parallel with the wind generator for recharging the energy storage devices of the first power supply unit;
   maintaining electrical isolation of the recharging system and the load during cycles; and
   combining outputs of the first and second power supplies at the combiner coupled to the electric drive motor, wherein the electric drive motor receives electric energy from one of the first and second power supply units which avoids intermittence due to a shifting in the intermediate section.

* * * * *